United States Patent
Lewis et al.

[15] 3,673,240
[45] June 27, 1972

[54] HYDROXYL-TERMINATED HYDROXYMETHYLABIETANYL ADIPATE

[72] Inventors: John B. Lewis; Glen W. Hedrick, both of Lake City, Fla.

[73] Assignee: The United States of America as represented by the Secretary of Agriculture

[22] Filed: May 12, 1970

[21] Appl. No.: 36,673

[52] U.S. Cl. .....................................260/485 G, 260/75 TN
[51] Int. Cl............................................................C07c 69/44
[58] Field of Search ...............................................260/485 G

[56] References Cited

UNITED STATES PATENTS 2,075,107   3/1937   Frazier...................................260/475

Primary Examiner—Lorraine A. Weinberger
Assistant Examiner—E. Jane Skelly
Attorney—R. Hoffman and W. Bier

[57] ABSTRACT

Ethylene glycol adipic acid polyester was modified by incorporating the naval stores derived 12-hydroxymethyltetrahydroabietanol in the polyester chain. The modified polyester was blended with a poly(ethylene adipate) glycol (mol. wt. 2000) and 1,4-butanediol, $Bu(OH)_2$, giving glycol mixtures which were reacted with toluene diisocyanate TDI. Clear strong polyurethane films (26.6% TDI) from glycol mixtures (average hydroxyl equivalents, OHE, of 252) containing 5, 10, 15, and 20 percent resinyl moiety were prepared and their polymer properties examined. Incorporation of the moiety gave strength, toughness, and stiffness to films which otherwise would have been soft and tacky. Glycol mixtures having higher hydroxyl equivalent values required less isocyanate and addition of the resinyl glycol gave strong elastic films from a composition containing 16.6% TDI.

Experimental data suggests that use of the bulky 12-hydroxymethyltetrahydroabietanol may be an important contribution to polyurethane technology.

1 Claim, No Drawings

HYDROXYL-TERMINATED HYDROXYMETHYLABIETANYL ADIPATE

A non-exclusive, irrevocable, royalty-free license in the invention herein described, throughout the world for all purposes of the U.S. Government, with the power to grant sublicenses for such purposes, is hereby granted to the Government of the United States of America.

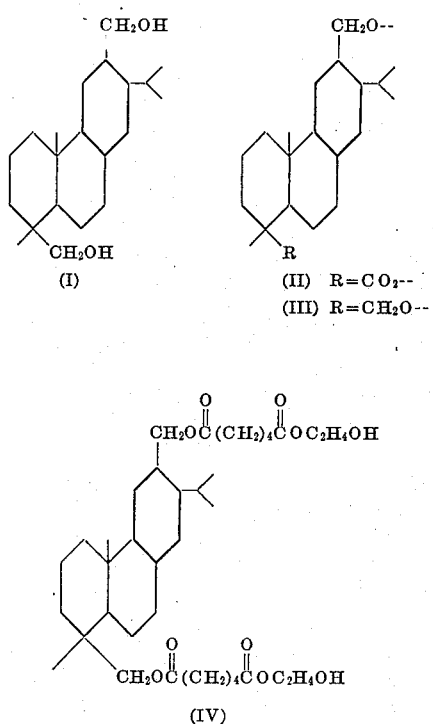

For the past few years a study to develop new markets for rosin has been underway to make poly-functional derivatives of resin acid and rosin by introduction of hydroxymethyl groups. Parkin and Hedrick [J. Org. Chem., 30, 2356 (1965)] and Parkin et al. [I&EC, Prod. Res. & Dev., 5, 257 (1966)] describe the reaction of levopimaric acid with formaldehyde. The adduct resulting from this reaction is readily converted to the diol, 12-hyroxymethyltetrahydroabietanol (I).

Pine oleoresin (pine gum), the exudate from the living pine tree, contains from 18 to 25 percent levopimaric acid, and since its reaction in situ in gum with formaldehyde is essentially quantitative, gum might be considered an economical source for the abietanol derivative. The glycol is easy to obtain pure. Initial experiments to use it in polyurethanes demonstrated problems resulting from insolubility characteristics and melting point of 183° C. This invention shows the results of incorporating the hydroxymethylabietanol derivative in hydroxyl-terminated polyglycol adipates to overcome the adverse physical properties and then use of the modified glycol adipates in polyurethane elastomers.

Polyester urethane thermoplastic polymers are becoming more popular industrially because of the unique properties obtainable by changes in formulations which result in markets formerly filled by use of one or more old line plastics.

A study was undertaken to determine the effect the bulky resinyl moiety had on the properties of polyester-derived urethane polymers. In a related paper Lewis and Hedrick [I&EC, Prod. Res. & Dev., in press (1969)] describe polyurethanes made from polypropylene glycols modified by incorporating the resinyl moieties II and III in the polyether chain.

To evaluate the resinyl glycol (I), the glycol was reacted with 2 mole equivalents of adipic acid and the resulting adipate was heated with excess ethylene glycol until the acid value indicated the acid had all reacted. This glycol was then blended with poly(ethylene adipate) glycol (OHE, approximately 1000) and 1,4-butanediol and the glycol blend reacted with diisocyanate. In the first experiments TDI was used and since the results were meaningful and perhaps unusual, this isocyanate was used throughout to prepared polymers in a one-step process.

The preparation of the glycol (IV) was surprisingly easy and competitive reactions from transesterification were of little consequence. Conversion of 12-hyroxymethyltetrahydroabietanol to IV eliminated the problem resulting from its low solubility and high melting point. Glycol (IV) was easily mixed with other glycols used in the experiments reported. No attempt was made to prepare higher molecular weight esters of I. Mixed ethylene glycol adipic acid esters of 12-hydroxymethyltetrahydroabietic acid could not be made without considerable ester interchange. The same was true of the ethylene glycol ester of this acid.

Early workers concluded the optimum molecular weight of the poly (ethylene adipate) glycol was 2,000, and also report data showing that 1,4-butanediol was probably superior to other commercially available aliphatic diols when used as an extender.

Early workers reacted the poly (ethylene adipate) glycol with excess 4,4-diphenylmethyl diisocyanate to obtain an isocyanate-terminated polyurethane which was reacted with the extender to produce high molecular weight (30 to 50,000) polyurethanes. Early experiments with resinyl glycols, employing a two-step process using butanediol as an extender gave polymers having tensile properties almost identical to those obtained using a one-step process. It was concluded that the combined effects of TDI and the resinyl moiety masked the differences resulting from a two step preparation.

In the present invention, polyurethanes from TDI and a mixture of poly (ethylene adipate) glycol (mol. wt., 2,000) and butanediol were soft and weak with an average hydroxyl equivalent of the glycol mixture of about 250. An incorporation of 5 percent of the resinyl material (III) in the formulation had a marked increase in the tensile properties. Additional increases of 10, 15, and 20 percent resulted in films having increased strength and stiffness (items 1 to 4, Table 1) and at 25 percent the hot polymer mixture was too viscous to handle and was hard and brittle cold. The average OHE of the glycol mixture in this series was held at 252 and the maximum variance in resinyl composition with this OHE value was from 5 to 20 percent because of the elastic properties of the film. The resinyl compound (III) requirement was less for polyurethanes made from glycol mixtures with lower average molecular weights. The opposite effect was observed when the average molecular weight of the mixture was increased (Item 5, Table 1). Since the NCO:OH ratio was in each case 1.05:1, an increase in molecular weight called for less isocyanate.

The literature references above state that aromatic rings phenyl or naphthalene and branching of methyl groups have the greatest effect on modulus.

Pigott et al. [J. Chem. Eng. Data 5, 391 (1960)] state that because of increased bulkiness and rigidity of naphthalene diisocyanate when compared with p-phenylene diisocyanate in urethanes, substantial increases in hardness and 300 percent modulus were noted. When TDI was compared with p-phenylene diisocyanate the effect of the reduced symmetry combined with the methyl substituents was demonstrated by a general decrease in tensile, modulus, tear, and hardness. When comparing polyester glycols, the tensile and modulus of the elastomers made from a polyester containing methyl side chains were significantly lower than for the elastomers prepared from linear polyesters.

TABLE 1.—POLYURETHANE FILMS FROM POLYESTER (IV)

| Item | Polyester (IV) equiv. | Conc. of III in film, percent | Bu(OH)₂ equiv. | Poly (ethylene adipate) equiv. | Ave. OHE glycol mix | Tensile strength p.s.i. | Modulus, p.s.i., 100% | 200% | 300% | Elongation, percent[c] | Brittle point, °C. | Stiffness, T_f °C. | Taber abrasion wt. loss percent ×10⁻² | Durometer Shore "A" hardness |
|---|---|---|---|---|---|---|---|---|---|---|---|---|---|---|
| 1 | [a].0508 | 5 | 0.341 | 0.0873 | 252 | 3,524 | 229 | 311 | 382 | 592 | −25 | −7.0 | 0.56 | 65 |
| 2 | [a].112 | 10 | 0.305 | 0.0715 | 252 | 5,774 | 247 | 328 | 442 | 570 | −27 | −0.5 | 1.24 | 70 |
| 3 | [a].153 | 15 | 0.27 | 0.0556 | 252 | 6,067 | 447 | 749 | 1,548 | 450 | −12 | +7.0 | 0.50 | 88 |
| 4 | [a].206 | 20 | 0.235 | 0.0398 | 252 | 8,532 | 1,219 | 2,148 | 4,415 | 411 | −3.5 | +16.0 | 0.77 | 90 |
| 5 | [b].258 | 25 | | 0.0454 | 455 | 4,554 | 285 | 385 | 550 | 625 | −12.5 | +6.0 | 0.62 | 85 |
| 6[d] | | | 0.20 | 0.100 | 340 | 4,600 | | | | 350 | 600 | | | 40 |
| 7[e] | | | | | 250 | 4,300 | | | | 360 | 680 | | | |

[a] OHE, 343.   [b] OHE, 358; TDI equiv. for (1) through (4) inc., 0.50; for (5), 0.313; NCO:OH ratio equiv., 1.05:1.   [c] Taken from bench marks.
[d] Pigott et al. (1960), Table 1; TDI, .32 equiv.; NCO:OH ratio, 1.07:1, Shore B hardness.   [e] Schollenberger [Polyurethane Technology, 10, 197 (1960)]; Table 2, Poly(tetramethylene adipate) glycol, 0.2 equiv.; 1,4-bis (2-hydroxymethoxy) benzene, 0.3 e.uiv.; TDI, .50 epuiv.

At this time the reasons for the effect of incorporating the glycol (I) in the polyurethane chain is not clear. The resinyl group is far more bulky and has a greater number of alkyl substituents than materials heretofore investigated. The bulkiness should result in an increase in modulus which is demonstrated by date in Table 1. Based on published data above, the lack of symmetry and the presence of the alkyl substituents combined with the effects of TDI in the polymers should have resulted in films with reduced strength. This was not the case.

The increase in strength resulting from addition of I may result from entanglement; however, evidence against this is the complete recovery of specimens after stretching almost to the breaking point. The recovery rate, however, decreases with increase in incorporation of I.

Item 5 in Table 1 has the following composition percent: glycol (IV), 55.6; poly (ethylene adipate) glycol, 27.77; and TDI, 16.63. This was added to demonstrate briefly the possibilities which might be achieved by variations in formulations and to show the effect of an increased average OHE, in particular, as this increase relates to the amount of TDI required. Items 6 and 7 are taken from the literature and are inserted for comparison purposes.

EXAMPLE 1

Hydroxyl-terminated Hydroxymethylabietanyl Adipate (IV)

12-Hydroxymethyltetrahydroabietanol (I) (322.5 g; 1.0 mole) and adipic acid (292 g; 2.0 moles) were heated to 190°–200° C while sparging with a slow stream of nitrogen until water of the reaction had all distilled. The product was a colorless, low-melting solid, 576 g; calc'd: 578 g.

Anal. calc'd for $C_{33}H_{52}O_8$: N.E., 288.2. Found: N.E., 294.

Ethylene glycol (186 g; 3 moles) was added and heating (195° C) resumed while slowly sparging with nitrogen. After 2½ hours [acid number (A.N.) 9] ethylene glycol (31 g; 0.5 mole) was added and the batch temperature was raised to 230° C and held about an hour (A.N., 2.8). The temperature was lowered to 100° C and vacuum applied (0.3 mm) for 2 hours to remove excess ethylene glycol, (A.N., 2.2; 658 g).

Anal. calc'd for $C_{37}H_{60}O_{10}$: OHE, 332.24. Found: OHE, 343.

In another experiment, heating under vacuum to remove excess ethylene glycol was continued until a constant weight was obtained.

Calc'd: OHE, 332.24; S.E., 166.12. Found: OHE, 358.7; S.E., 167.6.

EXAMPLE 2

Polymer Preparation

For polymer preparation, experience dictated that the average hydroxyl equivalent (OHE) of the glycol blend should be approximately 250. A typical film preparation is as follows. A poly (ethylene adipate) glycol 88.28 g (OHE, 1030), was heated to 100° C at 0.2 mm for 30 min., and glycol removed leaving 87.28 g in the flask (Item 1, Table 1). Glycol IV was added, heated to 100° C for 15 min., degassed at 0.2 mm, and then butanediol added, mixed, and degassed at 100° C at 35 mm. After cooling to 60° C, the TDI was added, mixed at atmospheric pressure, then heated to 85° C at 0.2 mm. pressure until mixing was complete. Some cooling by a water bath was required. The clear liquid polymer mixture was poured hot into molds which consisted of a 6 × 6 inch (inside) aluminum metal frame clamped to a one-fourth inch thick aluminum sheet covered with thin aluminum foil. The metal frames and plate were enclosed in a galvanized, steel, square box covered with plywood which supported a thermometer. The plates were maintained at 100°–110° C by a hot plate. The reaction mixture was poured onto the foil in an amount (about 42 g) so that approximately 1/16-inch thick films resulted. Eighteen hours at 100°–110° C was required for curing.

The films were cut to remove them from the frames, immersed in dilute mineral acid to dissolve the foil, and washed, then exposed to the atmosphere about one week on the laboratory bench.

Tensile properties of the clear, almost colorless films were run at the Naval Stores Laboratory and other tests were made by commercial laboratories.

All the films using formulations in Table 1 were prepared as above. Results are tabulated in Table 1.

We claim:

1. A compound represented by the formula

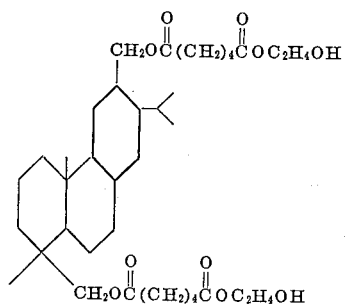

* * * * *